Sept. 24, 1968     C. DEDIAN     3,402,946
THREADLESS PIPE CONNECTION SYSTEM
Filed Oct. 3, 1966     2 Sheets-Sheet 1
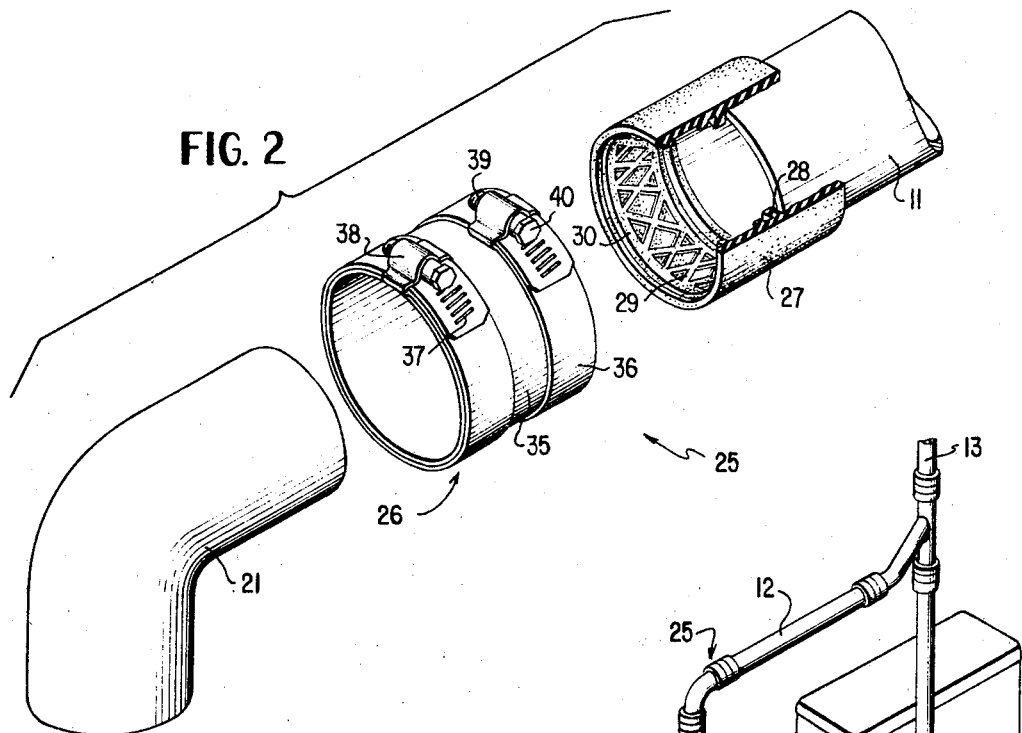
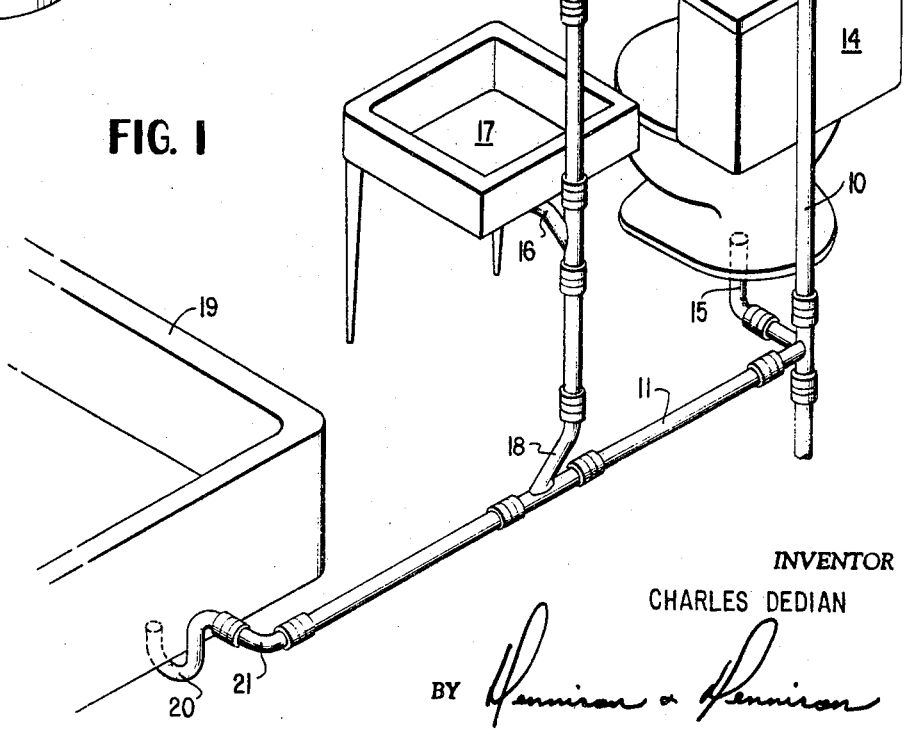
INVENTOR
CHARLES DEDIAN
BY *Hennison & Hennison*
ATTORNEYS.

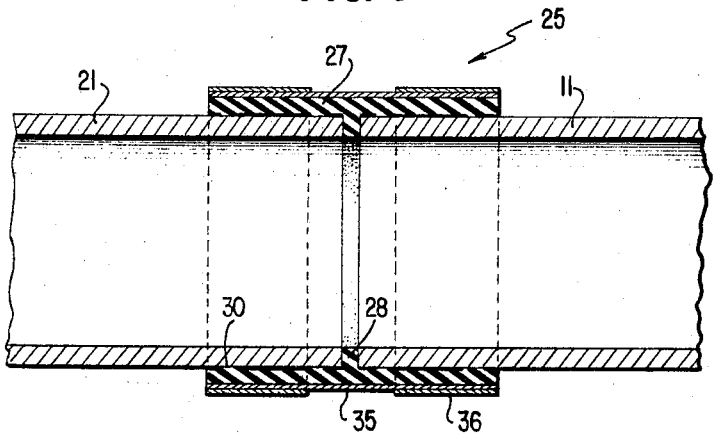
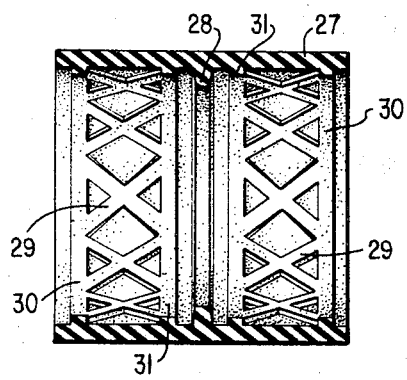
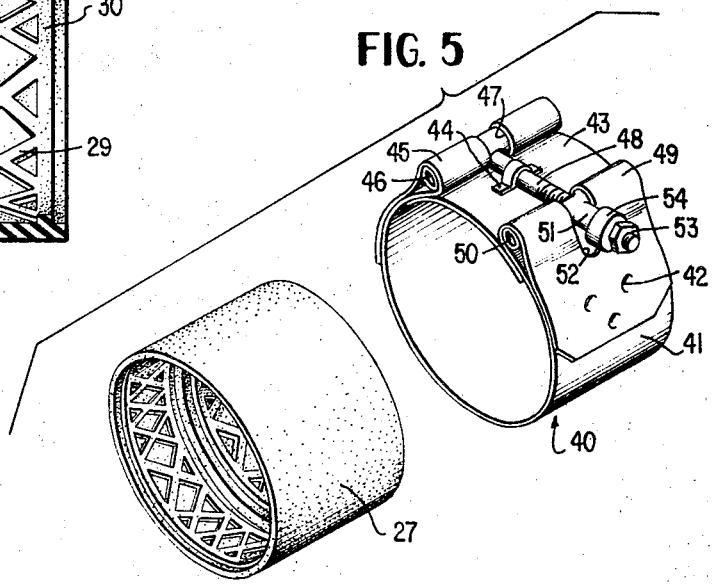

United States Patent Office 3,402,946
Patented Sept. 24, 1968

3,402,946
THREADLESS PIPE CONNECTION SYSTEM
Charles Dedian, 203 Desota Drive,
Richmond, Va. 23229
Filed Oct. 3, 1966, Ser. No. 583,582
3 Claims. (Cl. 285—236)

ABSTRACT OF THE DISCLOSURE

A connection for unthreaded pipe sections consisting of an elastomeric sleeve having internal criss-cross sealing ribs and spaced annular seating rings to limit pipe insertion, and a metal band having tightening means thereon to tightly compress the sleeve on the pipe ends.

---

The present invention relates to new and useful improvements in a pipe connection system, and more especially, to improvements in couplings of the type employed to interconnect unthreaded pipe ends.

In the prior art methods of connecting plumbing and similar pipe, it has been conventional practice for more than a century, to provide threaded connections between adjacent aligned pipe sections. In order to provide a relatively water-tight and well sealed joint in soil pipes, and the like, the use of lead and okum was required. Previously, such interconnection of pipes involved the art of packing, pouring and caulking lead-okum joints. Such installation required considerable skill and a large amount of time for highly trained and highly paid plumbers. When bell and spigot joints were utilized, the seal was achieved by the packing of okum about the spigot, then pouring lead which must first be heated by a torch over the okum, and finally hand caulking until the joint was pressure tight.

Such installations as contemplated in the prior art systems were often hampered and delayed by inclement weather. Further, pipe connections that had to be made in awkward corners or overhead presented additional difficulties. The present invention overcomes the difficulties inherent in the prior art and provides a structure and system which will enable relatively unskilled workmen to assemble a plumbing system or will alternatively permit the skilled plumber to make up more joints per hour than was previously possible. With the new system herein proposed, many joints can be pre-assembled on the site prior to final installation.

It is one object of the present invention to provide a mechanical joint adapted for attachment to and connection of unthreaded ends of pipe sections.

It is a further object of the instant invention to provide a joint for sections of galvanized steel soil pipe obviating the necessity for the use of okum, lead, and caulking.

An additional object of the instant invention is to present a pipe connection system which may be installed in dangerous environments such as a highly combustile atmosphere and which eliminates the necessity for the use of molten lead and a torch.

Another important object of the present invention is to provide a pipe connection for galvanized steel pipe which preserves the integrity of the zinc coating of the pipe since the same need not be cut for threading purposes.

A still further object of the instant invention is to provide a coupling for opposed aligned threadless pipe sections which can be installed in any weather and in any position and if desired, underwater.

Another object of this invention is to provide a pipe coupling which will provide a water-tight and gas-tight joint and which incorporates an elastomeric gasket.

A still further object of the present invention is to provide an elastomeric gasket construction for a threadless pipe coupling which has a plurality of spaced annular sealing surfaces providing independent seals so that in the event one of the seals is attacked by the fluid passing through the pipe system, another of the seals will effectively prevent leakage.

Another object of this invention is to provide a threadless pipe connection system incorporating a variety of interchangeable threadless pipe fittings and a novel clamping assembly and gasket for securing aligned fittings and pipe together.

Other objects of the invention are to provide a threadless pipe connection system bearing the above objects in mind which is of simple construction, has a minimum number of parts, is inexpensive to manufacture, is safe in use, saves considerable time in installation and may be used with little training.

For yet other objects and for a better understanding of the invention, reference may be had to the following detailed description taken in conjunction with the accompanying drawings.

In the drawings which illustrate the best mode now contemplated by me for carrying out my invention:

FIGURE 1 is a perspective view of a typical bathroom plumbing drainage and waste system incorporating the present invention;

FIGURE 2 is an exploded perspective view showing the component parts of a typical connection between a straight pipe and an elbow with certain portions of the gasket broken away to show the internal details thereof;

FIGURE 3 is a sectional view of an assembled threadless pipe connection according to the invention;

FIGURE 4 is a sectional view of the gasket shown in FIGURE 2; and

FIGURE 5 is an exploded perspective of a modified form of shield clamp assembly and gasket.

Reference is now made more specifically to the drawings, wherein like numerals designate similar parts throughout the several views.

A typical bathroom drainage and waste disposal system in which the invention may be employed is illustrated in FIGURE 1 and incorporates a main soil pipe 10 and interconnecting branch drain lines 11 and 12. A conventional vent 13 extends upwardly through the roof of the structure. This arrangement will fit easily in the 2 x 4 inch framing which forms the wall of the bathroom. A water closet 14 has its drain interconnected with the main line 10 by means of a 90 degree closet bend or long turn elbow 15.

A long turn T–Y 16 interconnects the lavatory 17 with the branch drain line 12. The branch drain line 12 in turn, interconnects with line 11 at a second long turn T–Y 18. A bathtub or shower stall 19 has its drain connected by means of a P-trap 20 through a 90 degree long turn elbow 21 with the drain line 11. It will be obvious that many other types of fittings may be employed and this arrangement is merely shown as a typical hook-up.

All of the fittings and straight pipe employed in the arrangement of FIGURE 1 are formed of galvanized steel, although, of course, other materials including plastics could well be used if desired. Such galvanized steel pipe is conventionally made by treating the steel with a zinc coating which provides for long life and rust prevention. It will, of course, be understood that a wide variety of various fittings will be provided for use in any desired system including, but not limited to, various angle elbows, T's, Y's, branches, reducers, clean-out plugs and P and S traps.

All of the fittings and straight pipe are unthreaded and are interconnected by means of a pipe joint coupling shown generally at 25. The pipe joint connection is specifically designed for use on pipe sections having no threads cut therein which maintains the integrity of the zinc coating and prohibits formation of rust or scale on the end areas of the pipes. The connection 25 comprises a shield clamp assembly 26 and an annular resilient gasket or packing member 27.

The packing member 27 is more clearly shown in detail in FIGURE 4 and is formed preferably of an elastomeric material, such as neoprene, synthetic rubber. Neoprene is well known for its resistance to soil chemicals and petroleum products as well as its high resistance to compression set weathering and attack by fungus. Gasket 27 is molded or otherwise formed with a centrally located annular seating ring 28. This ring serves as an abutment surface for locating the end faces of each of the pipe sections to be joined as clearly shown in FIGURES 2 and 3. Since the sleeve or gasket 27 is formed of neoprene or an equivalent, it is fairly resilient and the ring 28 allows a certain amount of expansion and/or contraction for temperature, pressure, etc. Axially spaced on either side of the seating ring 28 are raised waffle-pattern sealing ridges 29. These ridges are arranged in a criss-cross fashion extending from and between two annular ridges 30 and 31 of the same depth. These ridges or surfaces engage tightly against the outside of the pipe or fitting and may be compressed thereagainst by means of the shield clamp assembly 26 as described hereinafter in greater detail. The criss-cross arrangement provides a large area in sealing contact with the pipe and serves to prevent leakage in the event one of the outer surfaces becomes scored or mutilated during assembly or usage. In effect, a plurality of sealing surfaces are thereby provided. It will be understood, of course, that the outer surface of the sleeve 27 is perfectly smooth.

The shield clamp assembly 26 is adapted to tightly secure the pipe ends together within the sleeve 27 and includes a band 35 preferably formed of stainless steel. The band is formed of a sheet of metal having its ends overlapped to form a tube and freely slidable one on the other as shown in FIGURE 2. The tube as formed is at least as long as sleeve 27. Such a clamping band provides great strength and resistance to corrosion. Tightening of the band about the elastomeric sleeve and the inserted pipe sections is accomplished by means of two similar worm gear clamps provided adjacent each end of the band 35. These bands are preferably spot welded or otherwise permanently secured to the band and include elongated strap members 36 having their ends overlapped and having one end provided with a plurality of spaced and angled slots 37. A circular screw housing 38 is provided for each of the bands 36 and is attached to the bottom of the two overlapping ends of the band. Retention means are provided inside of the housings for co-operation with adjusting screws 39 to permit them to be rotated and yet not removed as shown in FIGURE 2. This arrangement is somewhat similar to the conventional radiator hose clamps now being used in the automotive industry. One end of the screw 39 is preferably provided with a hex head 40 for tightening purposes.

It will thus be readily recognized that the slotted ends of the straps 36 are received beneath the screw threads on the members 39 which are rotatably supported in the housings 38. The threads are engaged in the angled slots 37 and hence, tightening or loosening of the screws by means of a tool applied to the heads 40 effects tightening or loosening of the band 35. It will also be recognized that one end of the band may be tightened more than the the other so as to effect a differential compression on the sleeve 27 to compensate for slight manufacturing size differences between the pipe section coming in to one end of the sleeve as at 11 and the pipe section 21 coming in to the other end of the sleeve.

In order to make up a typical pipe joint, the sleeve or gasket 27 is slipped onto one end of the galvanized steel pipe or fitting until the central annular seating ring 28 firmly abuts against the pipe end face. The shield clamp assembly 26 is preferably placed loosely around the other pipe end section to be joined and the second pipe section is then inserted into the elastomeric sleeve and abutted against the integrally formed seating ring 28 inside of the gasket. The shield clamp assembly 26 is then slid axially so that the sleeve 27 is totally enclosed or at least centrally located within the shield clamp assembly and the hex heads 40 are then tightened, preferably with a torque wrench so as to insure proper compression of the gasket 27 about the pipe periphery. It has been found from experience that each of the worm gear clamp members should be set firmly to within the range of 40 to 55 inch pounds of torque.

In FIGURE 5 I have shown a modified form of shield clamp assembly designated as 40. In this particular arrangement the band 41 extends somewhat less than 360 degrees and the free ends thereof are folded back about themselves and are spot welded onto the band as at 42. The folded over portion provides a tubular passage or bearing for the bolt and nut pins as hereinafter explained in greater detail. An arcuate spanning segment 43 is formed of the same gauge of sheet metal as the band 41 and fills the void between the two end portions which overlap and are free to ride on the same. A U-shaped retaining clip 44 is spot welded or otherwise secured to the mid-portion of segment 43.

Pivotally received within the folded over band portion 45 is a pivot pin 46 which is free to rotate therewithin. Extending transversely from the central portion of the pin and through a cut-out opening 47 in the folded back portion 45 is a threaded bolt 48 which passes through the U-shaped bracket 44. The folded back portion 49 on the other end of the band 41 has a hollow pivot pin 50 received therewithin, which pin has a T-shaped central portion 51 extending through a cut-out portion 52 formed in the folded back section 49. Portion 51 is tubular in cross-section and hollow and the bolt 48 passes therethrough. A nut 53 is threaded onto the end of the bolt 48 and abuts against a ferrule 54 formed on the portion 51. In this arrangement, rotation of the nut 53 will draw together the two ends of the band 41 above and slidably engaged on the portion 43 to effect tightening of the band. A similar elastomeric sleeve 27 is provided in this arrangement.

While reference has been made in this specification to the preferred use of galvanized steel pipe, the invention may also be used with uncoated pipe or with pipe dipped in enamel. It should also be understood that while I have shown and described a preferred embodiment of the invention, the drawings and detailed disclosure are to be construed in an illustrative rather than a limiting sense since the various modifications and substitutions of equivalents may be made by those skilled in the art within the spirit and scope of the invention as defined in the appended claims.

A joint made following the teachings of this invention will provide and meet all normal requirements and will withstand normal settlement, wood shrinkage, traffic, and extremes of temperature and pressure. The system may be used for under floor drains as the gasket or sleeve resists abrasion and is extremely leak-proof and provides protection against penetration by roots. It should also be noted that the acidity of certain soils has little affect upon the gasket.

What I claim and desire to protect by Letters Patent of the United States is:

1. A connection for joining two unthreaded pipe ends in end to end alignment comprising an elastomeric resilient gasket sleeve having an internal annular seating ring formed therein each of the pipe ends being adapted to fit within opposite ends of said sleeve with the end faces in tight abutment against said seating rings, two spaced annular ribs internally formed in the gasket sleeve on each side of the seating ring and a plurality of criss-cross ribs interconnecting each pair of annular ribs, a metal shield clamping band of tubular configuration received about the gasket sleeve and surrounding the same, and tightening means on said band for tightening the same compressing the gasket sleeve on the pipe ends seated therewithin.

2. A connection as defined in claim 1 wherein said metal shield clamping band has overlapped ends and wherein said tightening means is adapted to draw one end over the other.

3. A connection as defined in claim 2 wherein said tightening means comprises a worm screw fixed in a housing adjacent to each side of the band and cooperating slots formed on one of the band ends on each side thereof adapted to receive the thread of the worm screws.

References Cited

UNITED STATES PATENTS

| | | | |
|---|---|---|---|
| 2,776,153 | 1/1957 | Smith | 285—373 X |
| 3,061,339 | 10/1962 | Jewell | 285—236 |
| 3,233,922 | 2/1966 | Evans | 285—236 |
| 3,378,282 | 4/1968 | Demler | 285—236 X |

FOREIGN PATENTS

| | | |
|---|---|---|
| 1,150,947 | 8/1957 | France. |
| 933,560 | 8/1963 | Great Britain. |

EDWARD C. ALLEN, *Primary Examiner.*

THOMAS F. CALLAGHAN, *Assistant Examiner.*